United States Patent [19]

Sobotta

[11] 4,105,317
[45] Aug. 8, 1978

[54] CIRCULAR MAGAZINE FOR LINEAR MAGAZINE SLIDE PROJECTORS

[75] Inventor: Reinhard Sobotta, Braunschweig, Mascherode, Fed. Rep. of Germany

[73] Assignee: Rollei-Werke Franke & Heidecke, Braunschweig, Fed. Rep. of Germany

[21] Appl. No.: 829,099

[22] Filed: Aug. 30, 1977

[30] Foreign Application Priority Data

Sep. 10, 1976 [DE] Fed. Rep. of Germany ....... 2640700

[51] Int. Cl.² .................... G03B 23/06; B65D 85/48
[52] U.S. Cl. .................................. 353/117; 206/456
[58] Field of Search ............. 353/116, 117, 114, 115; 206/456

[56] References Cited

U.S. PATENT DOCUMENTS

| | | | |
|---|---|---|---|
| 3,304,639 | 2/1967 | Wiklund | 206/456 |
| 3,680,953 | 8/1972 | Rube | 206/456 |
| 3,977,519 | 8/1976 | Hultgren | 206/456 |
| 3,994,578 | 11/1976 | Barowski et al. | 353/117 |

Primary Examiner—Steven L. Stephan
Attorney, Agent, or Firm—Stonebraker, Shepard & Stephens

[57] ABSTRACT

A two-part circular magazine having an inner rotor with slide storing compartments and an outer stator enclosing the rotor is arranged to mount and operate in the magazine guide of a linear magazine slide projector. The stator has a tangential groove opening to the rotor in the region of a radial slot for transverse passage of a slide from the magazine, and the groove has side walls that fit opposite sides of a slide lifting ramp in the bottom of the magazine guide. The rotor exterior is positioned directly over the top of the lifting ramp when the magazine is mounted in the projector, and the stator has an inclined surface ascending from below the top of the lifting ramp upward to the level of the interior of the rotor in the region of the slot. The stator also has abutment surfaces that engage parts of the magazine guide to position and maintain the magazine accurately in place.

5 Claims, 2 Drawing Figures

CIRCULAR MAGAZINE FOR LINEAR MAGAZINE SLIDE PROJECTORS

BACKGROUND OF THE INVENTION

There is an ever increasing need for using circular magazines in projectors normally using linear or bar-type magazines, to take advantage of the possibility of endless projection, for example. Considerable difficulties are encountered, however, in devising a circular magazine that can be fitted in the magazine guide of a slide projector using linear magazines. One of the problems is a slide lifting ramp that is used in linear magazine slide projectors to elevate the slides relative to the magazine at the slide change plane so that the slide changing device can move the slides transversely of the magazine without any interference from the magazine. A two-part circular magazine having an innner rotor with slide storage compartments and an outer stator encircling the rotor cannot be easily fitted into the channel-shaped magazine guide at the slide change plane in substitution for a linear magazine, because the slide lifting ramp prevents a circular magazine from positioning slides at a proper elevation for movement by the slide changing device, and from positioning the magazine rotor for movement by the projector's magazine moving device.

One previous solution for this was to make the slide lifting ramp movable axially along the magazine channel to clear a space necessary for mounting a circular magazine at the slide change plane. This was workable but rather expensive.

The invention aims at a two-part circular magazine constructed in such a way as to be mountable in the magazine channel of a slide projector for linear magazines without requiring movement of the slide lifting ramp and with the circular magazine being operable without changing the projector mechanisms for operating with a linear magazine. The invention aims at simplicity, economy, and convenience in adapting a circular magazine to a linear magazine projector, and the invention involves consideration and use of many structural features of a linear magazine slide projector in making a compatible circular magazine.

SUMMARY OF THE INVENTION

The invention applies to a two-part circular magazine for a slide projector that has a channel-shaped magazine guide extending parallel with the projection axis to accommodate a linear magazine. The magazine guide has a lifting ramp arranged in the region of a slide change plane for lifting slides in a linear magazine to a predetermined height for transverse movement by a slide changing device. The circular magazine includes an annular rotor having slide storing compartments and an annular stator enclosing the rotor and having a radial slot for passage of a slide transversely relative to the magazine along the slide change plane. The stator has an exterior formed in the region of the slide passage slot to provide a generally tangential groove opening to the rotor, and the groove has side walls configured to fit opposite sides of the lifting ramp. The rotor has an exterior positioned directly over the top of the lifting ramp when the magazine is mounted in the magazine guide. The stator has an inclined surface ascending toward the rotor from the region of the slot, and the inclined surface extends from beneath the top of the lifting ramp up to the level of an interior surface of the rotor above the lifting ramp. The interior surface of the rotor is preferably formed with a circumferential bevel inclined downward in the region of the slot to a level below the upper end of the inclined surface of the stator.

The stator also preferably has several surfaces that engage existing surfaces or guides intended for use with linear magazines. These include a tangential ledge extending on opposite sides of the slide slot for resting on the upper surfaces of guides for a linear magazine, and a pair of projections that engage opposite sides of guides for the slide change device as formed on the top of the side wall of the magazine channel. Also, the stator preferably carries a sliding plate that is movable to overlie at least a portion of the slide slot, and the plate is arranged to engage the upper surfaces of the magazine guides to be moved clear of the slide slot when the magazine is mounted in the magazine guide.

DRAWINGS

FIG. 1 is a perspective view of a preferred embodiment of a circular magazine mounted on an illustrated fragment of a projector and showing parts necessary for understanding the invention; and FIG. 2 is a fragmentary cross-sectional view of the magazine of FIG. 1 taken along the line II—II thereof.

DETAILED DESCRIPTION

Figure 1:
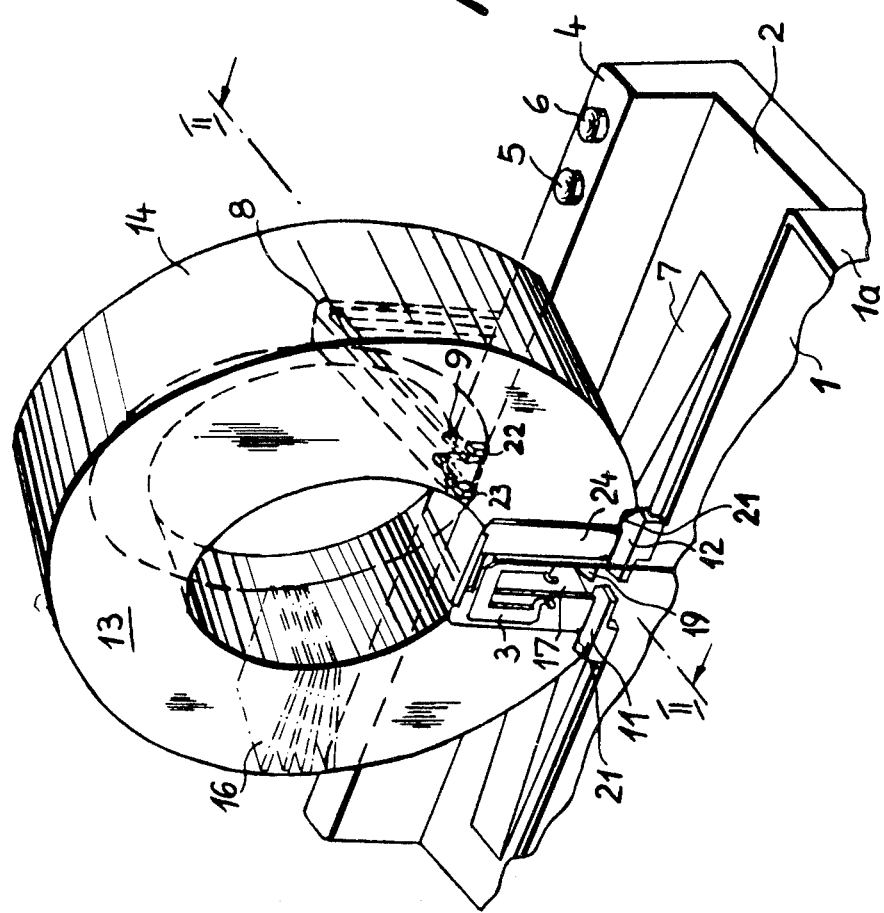

The magazine guide portion of projector 1 is shown in FIG. 1 to illustrate the relationship between projector 1 and circular magazine 13. Magazine guide 2 is generally channel shaped and extends along a side of the projector parallel with the projection axis of the projector. Magazine guide 2 is bounded on one side by projector housing wall 1a, and on the opposite side by magazine guide wall 4. A slot 3 is shown in housing wall 1a at the slide changing plane for allowing slides to pass transversely relative to a magazine into and out of the projector. Operating knobs 5 and 6 on magazine side wall 4 control projector functions.

A slide lifting ramp 7 is arranged in the bottom of magazine guide 2 for lifting slides from a linear or bar-type magazine to the proper elevation for transverse movement through slot 3 along the slide change plane for projection. A slide change device 8 moves slides transversely relative to a magazine, and slide change device 8 moves between a pair of guides 9 arranged on top of magazine channel side wall 4 for guiding the free leg of slide changer 8. Another pair of guide surfaces 11 and 12 are arranged on projector housing wall 1a at a specific distance from the bottom of the magazine guide and on opposite sides of the slide aperture 3 for engaging a ledge of a linear magazine to prevent vertical movement of the magazine. These features of projector 1 are used to cooperate with circular magazine 13 as described below.

Circular magazine 13 is a two-part magazine in the sense of having an annular stator 14 and an annular rotor 15 rotatably mounted within stator 14. Rotor 15 is divided into compartments for storing slides 16, and stator 14 has a radial slot 17 for the transverse passage of a slide 16 into or out of magazine 13. Slot 17 can be at least partially covered or closed by a sliding plate 24 so that a slide registered with slot 17 can be prevented from dropping out of magazine 13.

Figure 2:
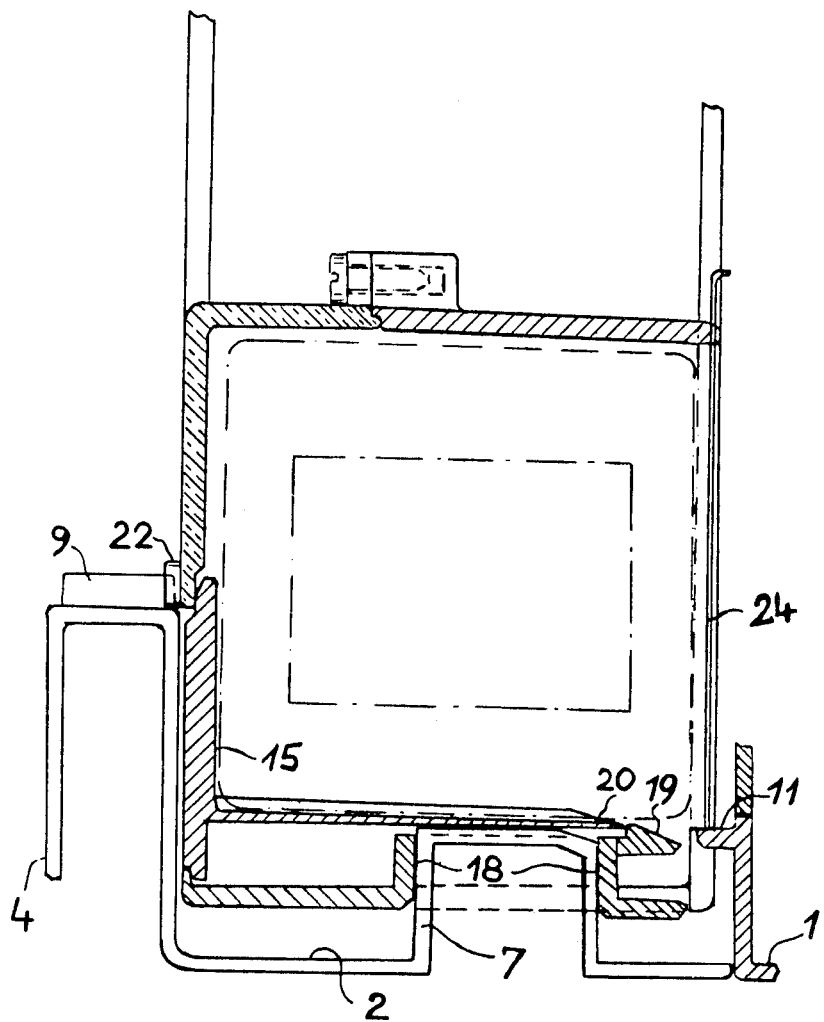

As best shown in FIG. 2, the exterior of stator 14 on its cylindrical perimeter is formed with a generally tangential groove 18 that opens to rotor 15. Groove 18 is formed in the region of slide passage slot 17 and has side walls that are shaped to fit opposite sides of lifting ramp 7. Groove 18 in stator 14 allows the exterior of rotor 15 to be positioned directly over the top of lifting ramp 7 when magazine 13 is mounted in magazine guide 2. A slight clearance exists between ramp 17 and rotor 15 so that rotor 15 is free to rotate within stator 14. Also, the engagement between the side walls of groove 18 and the side walls of ramp 7 prevents any transverse displacement of magazine 13 in magazine guide 2.

Stator 14 has an inclined surface 19 registered with slide passage slot 17 and ascending from below the top of lifting ramp 7 upwards to the level of the interior surface of rotor 15 above lifting ramp 7. Inclined surface 19 guides slides 16 upward as they enter magazine 13 so that slides 16 move above the level of lifting ramp 7 and onto the interior surface of rotor 15. Rotor 15 cooperates with the inclined surface 19 by preferably having a circumferential bevel 20 on its interior surface extending to below the upper end or maximum height of inclined surface 19. This prevents any slide blocking edge from occurring from variations due to manufacturing tolerances.

Stator 14 has a notch or opening on opposite sides of slide passage slot 17, and the upper edge of the notch or recess forms a ledge 21 that extends tangentially on both sides of slot 17 and rests on the upper surfaces of guides 11 and 12 when magazine 13 is mounted in magazine guide 2. The opposite side of stator 14 has a pair of projections 22 and 23 that engage opposite sides of guides 9 for the slide changer 8 for supporting and fixing the position of the magazine relative to the top of the magazine side wall 4. The seating of ledge 21 on the tops of magazine guides 11 and 12 and the seating of projections 22 and 23 on the top of magazine guide wall 4 next to changer guide 9 fixes magazine 13 accurately in a vertical position in the proper location in magazine guide 2 for registering slide slot 17 with aperture 3 and for accurately positioning rotor 15 slightly above the top of lifting ramp 7. Magazine 13 is held in the proper position with its slides disposable accurately on the slide change plane without any possibility of axial or rotational displacement relative to magazine guide 2.

Slide plate 24 for partially closing slide slot 17 to retain a registered slide in magazine 13 has its lower ends extending below ledge 21 when it partially covers slot 17. When magazine 13 is mounted in magazine guide 2, slide plate 24 engages the tops of magazine guides 11 and 12 and is lifted enough for automatically clearing slide passage slot 17 for transverse movement of slides.

What is claimed is:

1. A two-part circular magazine for a slide projector having a channel-shaped magazine guide extending parallel with a projection axis to accommodate a linear magazine, and a lifting ramp arranged in said magazine guide in the region of a slide change plane for lifting slides in a linear magazine to a predetermined height for transverse movement by a slide change device, said magazine including an annular rotor having slide storing compartments and an annular stator enclosing said rotor and having a radial slot for passage of a slide transversely relative to said magazine along a slide change plane, said magazine comprising:
   a. said stator having an exterior formed in the region of said slide passage slot to provide a generally tangential groove opening to said rotor;
   b. said groove having side walls configured to fit opposite sides of said lifting ramp;
   c. said rotor having an exterior positioned directly over the top of said lifting ramp when said magazine is mounted in said magazine guide;
   d. said stator having an inclined surface ascending toward said rotor from the region of said slot; and
   e. said inclined surface extending from beneath said top of said lifting ramp up to the level of an interior surface of said rotor above said lifting ramp.

2. The magazine of claim 1 wherein said interic surface of said rotor is formed with a circumferential bevel inclined downward in the region of said slot to a level below the upper end of said inclined surface.

3. The magazine of claim 1 wherein said projector has a pair of magazine guides on opposite sides of said slide change plane, a magazine guide side wall, and a pair of guides on the top of said side wall for guiding said slide change device, and wherein said stator is formed to provide a generally tangential ledge extending on opposite sides of said slot and shaped to rest on upper surfaces of said magazine guides when said magazine is mounted in said magazine guide, and said stator has a pair of projections that engage opposite sides of said slide change device guides when said magazine is mounted in said magazine guides.

4. The magazine of claim 3 wherein said stator has a sliding plate that is movable to overlie at least a portion of said slot, and said plate engages said upper surfaces of said magazine guides to be moved clear of said slot when said magazine is mounted in said magazine guide.

5. The magazine of claim 3 wherein said interior surface of said rotor is formed with a circumferential bevel inclined downward in the region of said slot to a level below the upper end of said inclined surface.

* * * * *